US012505237B2

(12) United States Patent
Rodriguez Bravo et al.

(10) Patent No.: US 12,505,237 B2
(45) Date of Patent: Dec. 23, 2025

(54) USER ACTIVITY BASED COGNITIVE QUESTION GENERATION

(71) Applicant: KYNDRYL, INC., New York, NY (US)

(72) Inventors: Cesar Augusto Rodriguez Bravo, Alajuela (CR); Erik Rueger, Ockenheim (DE); Craig M Trim, Ventura, CA (US); Maria Laura Alpizar Barrera, Alajuela (CR)

(73) Assignee: Kyndryl, Inc., New York, NY (US)

( * ) Notice: Subject to any disclaimer, the term of this patent is extended or adjusted under 35 U.S.C. 154(b) by 768 days.

(21) Appl. No.: 16/435,604

(22) Filed: Jun. 10, 2019

(65) Prior Publication Data

US 2020/0387816 A1    Dec. 10, 2020

(51) Int. Cl.
*G06F 21/62* (2013.01)
*A63F 9/18* (2006.01)
*G09B 7/00* (2006.01)
*H04W 12/03* (2021.01)
*G06N 5/043* (2023.01)

(52) U.S. Cl.
CPC ............ *G06F 21/6209* (2013.01); *A63F 9/18* (2013.01); *G06F 21/62* (2013.01); *G09B 7/00* (2013.01); *H04W 12/03* (2021.01); *G06N 5/043* (2013.01)

(58) Field of Classification Search
CPC ........ G06N 3/006; G06N 5/043; G06N 5/045; G09B 7/00; H04L 63/102; H04W 12/03; G06F 21/6209; G06F 21/62; A63F 9/18
See application file for complete search history.

(56) References Cited

U.S. PATENT DOCUMENTS

| 6,632,174 B1 | 10/2003 | Breznitz |
| 8,273,020 B2 | 9/2012 | Robinson et al. |
| 8,784,109 B2 | 7/2014 | Gottfried |

(Continued)

FOREIGN PATENT DOCUMENTS

| CN | 108780663 A | 11/2018 |
| CN | 109716382 A | 5/2019 |

(Continued)

OTHER PUBLICATIONS

Seufert et al. ("Gamification Framework for Personalized Surveys on Relationships in Online Social Networks", 2013 IEEE/ACM 6th International Conference on Utility and Cloud Computing, 2013, pp. 482-487) (Year: 2013).*

(Continued)

*Primary Examiner* — Miranda M Huang
*Assistant Examiner* — Chase P. Hinckley
(74) *Attorney, Agent, or Firm* — Erik Swanson; Andrew M. Calderon; Calderon Safran & Wright P.C.

(57) ABSTRACT

A method for cognitive question generation and presentation is provided. The method accesses activity data associated with a mobile computing device. The method generates a set of cognitive questions representing at least a portion of the activity data and generates an answer set for each cognitive question. The method dynamically selects one or more cognitive questions from the set of cognitive questions. The method generates a question interface presented by the mobile computing device and causes presentation of the selected cognitive question within the question interface.

20 Claims, 6 Drawing Sheets

(56) References Cited

U.S. PATENT DOCUMENTS

| | | | |
|---|---|---|---|
| 8,821,272 | B2 | 9/2014 | Jack et al. |
| 9,208,692 | B2 | 12/2015 | Considine et al. |
| 9,308,445 | B1 | 4/2016 | Merzenich et al. |
| 10,699,215 | B2* | 6/2020 | Devarakonda ......... G06N 5/022 |
| 10,929,392 | B1* | 2/2021 | Cheng ..................... G06N 3/08 |
| 10,981,058 | B2* | 4/2021 | Baker ..................... A63F 13/80 |
| 2010/0169144 | A1* | 7/2010 | Estill .................. G06Q 10/0637 |
| | | | 705/7.36 |
| 2011/0162067 | A1 | 6/2011 | Shuart et al. |
| 2013/0179472 | A1 | 7/2013 | Junqua et al. |
| 2014/0195272 | A1 | 7/2014 | Sadiq et al. |
| 2014/0358260 | A1* | 12/2014 | Burgin ............... G06Q 30/0277 |
| | | | 700/91 |
| 2015/0039903 | A1* | 2/2015 | Cash ..................... G06F 16/951 |
| | | | 707/774 |
| 2015/0056578 | A1 | 2/2015 | Olenick et al. |
| 2015/0072324 | A1* | 3/2015 | Pracar ..................... A61B 5/16 |
| | | | 434/236 |
| 2015/0248841 | A1* | 9/2015 | Peterson .................. G09B 7/07 |
| | | | 434/350 |
| 2016/0023099 | A1 | 1/2016 | Tymoszczuk |
| 2016/0342900 | A1* | 11/2016 | Allen ................... G06Q 10/109 |
| 2017/0105666 | A1* | 4/2017 | Lee ........................ A61B 5/165 |
| 2017/0160891 | A1 | 6/2017 | Chefalas et al. |
| 2018/0070823 | A1* | 3/2018 | Blackwell ............ A61B 5/0008 |
| 2018/0082544 | A1* | 3/2018 | Simon ................ G07F 17/3218 |
| 2018/0137433 | A1 | 5/2018 | Devarakonda et al. |
| 2018/0161681 | A1* | 6/2018 | Abecassis ............... A63F 13/61 |
| 2018/0181648 | A1* | 6/2018 | Chen ..................... G06F 16/951 |
| 2019/0014097 | A1* | 1/2019 | Hwang .................... H04L 63/08 |
| 2019/0158477 | A1* | 5/2019 | Nagaratnam ........... G06F 21/31 |
| 2020/0042597 | A1* | 2/2020 | Wu .......................... H04L 51/02 |
| 2020/0073998 | A1* | 3/2020 | Katz ........................ G06F 16/38 |
| 2020/0211408 | A1* | 7/2020 | Faulkner ............. H04L 12/1831 |
| 2020/0346111 | A1* | 11/2020 | Morrison ................ A63F 13/69 |

FOREIGN PATENT DOCUMENTS

| | | |
|---|---|---|
| KR | 1020130095999 A | 8/2013 |
| WO | 2012064999 A1 | 5/2012 |
| WO | 2018148365 A1 | 8/2018 |
| WO | 2019081640 A2 | 5/2019 |

OTHER PUBLICATIONS

Hangal et al. ("Personalized Memory Testing for Names Using Email Archives", https://mobisocial.stanford.edu/papers/brainkdd2014.pdf, 2014, pp. 1-9) (Year: 2014).*

Dennis et al. ("A Hierarchical Bayesian model of "memory for when" based on experience sampling data", CogSci 2017, pp. 295-300) (Year: 2017).*

Zeng et al. ("Towards Long-term Tracking and Detection of Early Dementia: A Computerized Cognitive Test Battery with Gamification", ICCSE'18, Jul. 2018, pp. 1-10) (Year: 2018).*

Kumar et al. ("Autobiographical recall of personally familiar names and temporal information in e-mails an automatic analytic approach using e-mail communications", Behavior Research Methods 51, Feb. 2019, pp. 1510-1530) (Year: 2019).*

Grandmaison et al. ("A critical review of memory stimulation programs in Alzheimer's disease", the Journal of neuropsychiatry and clinical neurosciences, 15.2, 2003, pp. 130-144) (Year: 2013).*

Ivanoiu et al. ("Patterns of impairment in autobiographical memory in the degenerative dementias constrain models of memory", Neuropsychologia, 44, 2006, pp. 1936-1955) (Year: 2006).*

Meckler et al. ("Towards understanding the effects of individual gamification elements on intrinsic motivation and performance", Computers in Human Behavior, 71, 2017, pp. 525-534) (Year: 2017).*

Of Ian Glover ("Play as you learn: gamification as a technique for motivating learners", Sheffield Hallam University, http://shura.shu.ac.uk/7172/, Proceedings of World Conference on Educational Multimedia, Hypermedia and Telecommunications 2013, AACE, 2013, pp. 1999-2008) (Year: 2013).*

Mora et al. ("Gamification of cognitive training: a crowdsourcing-inspired approach for older adults", Interaccion '16, Sep. 2016, pp. 1-8) (Year: 2016).*

Zmily et al. ("Study of the usability of spaced retrieval exercise using mobile devices for Alzheimer's disease rehabilitation," JMIR Mhealth Uhealth., 2014, pp. 1-18) (Year: 2014).*

Islam et al., "BSSSQS: A Blockchain Based Smart and Secured Scheme for Question Sharing in the Smart Education System" Dec. 5, 2018, arXiv: 1812.03917v1, pp. 1-14. (Year: 2018).*

Xu et Li, "Hashing based Answer Selection" May 26, 2019, arXiv: 1905.10718v1, pp. 1-10. (Year: 2019).*

Zhang et al., "Asking the Difficult Questions: Goal-Oriented Visual Question Generation via Intermediate Rewards" Nov. 21, 2017, arXiv: 1711.07614v1, pp. 1-10. (Year: 2017).*

Arumae et Liu, "Guiding Extractive Summarization with Question-Answering Rewards" Apr. 4, 2019, arXiv: 1904.0232v1, pp. 1-12. (Year: 2019).*

Hu et al., "Playing 20 Question Game with Policy-Based Reinforcement Learning" Jun. 24, 2019, arXiv: 1808.07645v3, pp. 1-10. (Year: 2019).*

Titus et al., "PySeal: A Python wrapper implementation of the Seal homomorphic encryption library" Mar. 5, 2018, arXiv: 1803.01891v1, pp. 1-2. (Year: 2018).*

Vinayagamurthy et al., "StealthDB: a Scalable Encrypted Database with Full SQL Query Support" Apr. 21, 2019, arXiv: 1711.02279v2, pp. 1-19. (Year: 2019).*

Palamakumbura et Usefi, "Homorphic Evaluation of Database Queries" Jun. 10, 2016, arXiv: 1606.03304v1, pp. 1-12. (Year: 2016).*

Sanyal et al., "TAPAS: Tricks to Accelerate (encrypted) Prediction as a Service" Jun. 9, 2018, arXiv: 1806.03461, pp. 1-14. (Year: 2018).*

Critten, "It brings it all back, all those good times; it makes me go close to tears." Creating digital personalised stories with people who have dementia, 2017, Alzheimer's Research UK and Alzheimer's Society, 34 pages, discovery.ucl.ac.uk/1540447/1/Critten_It_brings_it_all_back.pdf.

"Yu-kai Chou: Gamification & Behavioral Design", The 10 Best Productivity Apps that use Gamification in 2018, https://yukaichou.com/lifestyle-gamification/the-top-ten-gamified-productivity-apps/, printed Feb. 19, 2019, 16 pages.

Clabby, "IT trends for 2015: Power Systems, security and flash-as-memory", IT Landscape, Computer World, Jan. 14, 2015, https://www.computerworld.com/article/2859562/it-trends-for-2015-power-systems-security-and-lash-as-memory.html, 2 pages.

Raphael, "Broken Lollipop: 5 things that need to be fixed ASAP with Android 5.0", Android Intelligence, Computer World, Jan. 20, 2015, https://www.computerworld.com/article/2871662/android/broken-lollipop-android-50.html, 9 pages.

Mak, "MilestonePod: Running to Train and Win with Gamification", Gamification, Blog, p. 5, Dec. 15, 2015, http://www.gamification.co/page/5/, 29 pages.

Liberman, "Why Your Branded Content Marketing Should Put Gaming Into Play", Content Marketing Institute, Feb. 20, 2014, https://contentmarketinginstitute.com/2014/02/branded-content-marketing-put-gaming-into-play/, 15 pages.

"Research in Action", Research Highlights—Department of Computer Science, University of Toronto, 2012, 12 pages.

Noonoo, "6 New Apps to Gamify Learning", App Roundup, The Journal, Mar. 7, 2012, https://thejournal.com/articles/2012/03/07/6-new-apps-to-gamify-learning.aspx ?=THEMOB, 6 pages.

"Mind Games", Copyright, 2011-2019 Alzheimer's Research and Prevention Foundation, printed Feb. 19, 2019, http://alzheimersprevention.org/4-pillars-of-prevention/mind-games/, 1 page.

Whiteman, "Dementia breakthrough? Brain-training game 'significantly reduces risk'", Medical News Today, Nov. 16, 2017, https://www.medicalnewstoday.com/articles/320093.php, 5 pages.

Heid, "New Research Finds This Brain Game Can Guard Against Dementia", Prevention, Nov. 16, 2017, https://www.prevention.com/health/a20505084/brain-game-lower-dementia-risk/, 6 pages.

(56) References Cited

OTHER PUBLICATIONS

"Brain training game linked to lower dementia risk a decade later", Health, Nov. 16, 2017, New Scientist, The Daily Newsletter, https://www.newscientist.com/article/2153486-brain-training-game-linked-to-lower-dementia-risk-a-decade-later/, 3 pages.

"Brain Exercises and Dementia", WebMD, printed Feb. 19, 2019, https://www.webmd.com/alzheimers/guide/preventing-dementia-brain-exercises#1, 6 pages.

Donnelly, "Brain training games boost memory and may reduce the risk of dementia, research suggests", The Telegraph, News, Science, Jul. 3, 2017, https://www.telegraph.co.uk/science/2017/07/02/brain-training-games-boost-memory-may-reduce-risk-dementia-research/, 3 pages.

Clark, "Dementia cure? Brain games to reduce risk of memory loss might Not work", Express, Published, Jul. 14, 2017, https://www.express.co.uk/life-style/health/828389/dementia-cure-symptoms-memory-brain-training-games, 4 pages.

Hurley, "Could Brain Training Prevent Dementia?", The New Yorker, Jul. 24, 2016, https://www.newyorker.com/tech/annals-of-technology/could-brain-training-prevent-dementia, 6 pages.

Kelland, "New brain training app improves memories of people with early-stage Dementia", Independent, Jul. 3, 2017, https://www.independent.co.uk/news/business/news/brain-training-app-dementia-early-stage-patients-people-help-memories-improve-games-show-cambridge-a7820301.html, 4 pages.

International Search Report and Written Opinion, International Application No. PCT/IB2020/055301, Dates Sep. 18, 2020, 9 pages.

\* cited by examiner

USER ACTIVITY BASED COGNITIVE QUESTION GENERATION

BACKGROUND

Generally, mobile computing devices enable interaction with applications, data sets, and other mobile computing devices. Users, interacting with mobile computing devices, may generate data associated with their interactions.

Some mobile computing device applications are configured to promote neuroplasticity and cognitive exercise. Such applications are often broadly crafted for a broad number of users. Applications may test cognitive ability of users, provide preprogrammed stimuli, and allow creation and transmission of reminders by people associated with the user of the application. Typically, current applications are aimed to generally address neuroplasticity and cognitive concerns, once identified, using techniques and stimuli common to all users of the application.

SUMMARY

According to an embodiment described herein, a computer-implemented method for cognitive question generation is provided. The cognitive questions may be generated by accessing activity data associated with a mobile computing device. The activity data may include information associated with a user of the mobile computing device. In some instances, the information includes at least one of social media data, location history, purchase history, and calendar data. The method may generate a set of cognitive questions representing at least a portion of the activity data and generate an answer set for each cognitive question of the set of cognitive questions. The answer set may contain a correct answer and a plurality of incorrect answers. The method dynamically selects one or more cognitive questions from the set of cognitive questions and generates a question interface presented by the mobile computing device. The method may then cause presentation of a selected cognitive question from the one or more cognitive questions within the question interface presented at the mobile computing device. The presentation of the selected cognitive question may include presentation of an answer set corresponding to the selected cognitive question.

In some embodiments, accessing the activity data further comprises determining one or more user profile permissions associated with a user of the mobile computing device. The method may access a subset of activity data available to the mobile computing device. The subset of activity data may correspond to the one or more user profile permissions. The one or more cognitive questions may be dynamically selected based on the subset of activity data and the one or more user profile permissions.

In some embodiments, dynamically selecting the one or more cognitive questions further comprises accessing one or more user profile permissions. The method determines a preferred subset of activity data based on the one or more user profile permissions and determines a frequency of questions based on the one or more user profile permissions. The method then determines a presentation time for the one or more cognitive questions based on the frequency of questions and the one or more user profile permissions.

In some embodiments, the method further comprises encrypting the set of cognitive questions in response to generating the set of cognitive questions. The method also encrypts the answer set for each cognitive question in response to generating each answer set. The method may encrypt the cognitive questions and corresponding answer sets together or separately.

Some embodiments of the inventive concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating or transporting the program for use, by, or in connection, with the instruction execution system, apparatus, or device.

DETAILED DESCRIPTION

The present disclosure relates generally to a method for analyzing user activities and generating questions from the analysis, and more specifically, but not exclusively, to a computer-implemented method for generating cognitive questions for memory games presented within a mobile computing device. The present disclosure relates further to a related system for generating cognitive questions and memory game environments, and a computer program product.

Certain populations and age groups are growing exponentially. Neurologists and memory specialists often recommend that people engage in memory exercises to aid in memory function and, in some instances, to delay or reduce rise of certain neurological disorders. Solutions to address needs and circumstances of such populations may impact a variety of virtual and real-world sectors, such as the health care field, digital media, and other disparate services.

Embodiments of the present disclosure enable creation of cognitive questions based on user activities and experiences to generate memory games configured for use in addressing cognitive decline. The cognitive question system may gather user and device data from a plurality of inputs. From the user and device data, the cognitive question system generates question and answer pairs. For example, a cognitive engine of the cognitive question system may gather user data from mobile computing devices or wearable computing devices to generate questions relating to day to day activities of a user. Questions, such as a location of last night's dinner or parking, a last time visiting a favorite coffee shop, or a last book read by the user, may be generated as trivia questions tailored to the user. For each question, the cognitive engine generates correct and incorrect answers. The questions may be displayed, along with the answers to gamify previous experiences and actions to spur and support memory and general cognitive health.

A reward system may also be incorporated into the cognitive question system. The reward system may provide rewards based on user scores for answering questions to incentivize interaction with the cognitive question system. Rewards may be virtual, such as virtual pets, assistants, or in game bonuses. Rewards may also be tangible, delivered to the user in the real world. The cognitive question system and the reward system may be connected to third party application programming interfaces to provide discounts or other third-party awards to the user.

Figure 1:
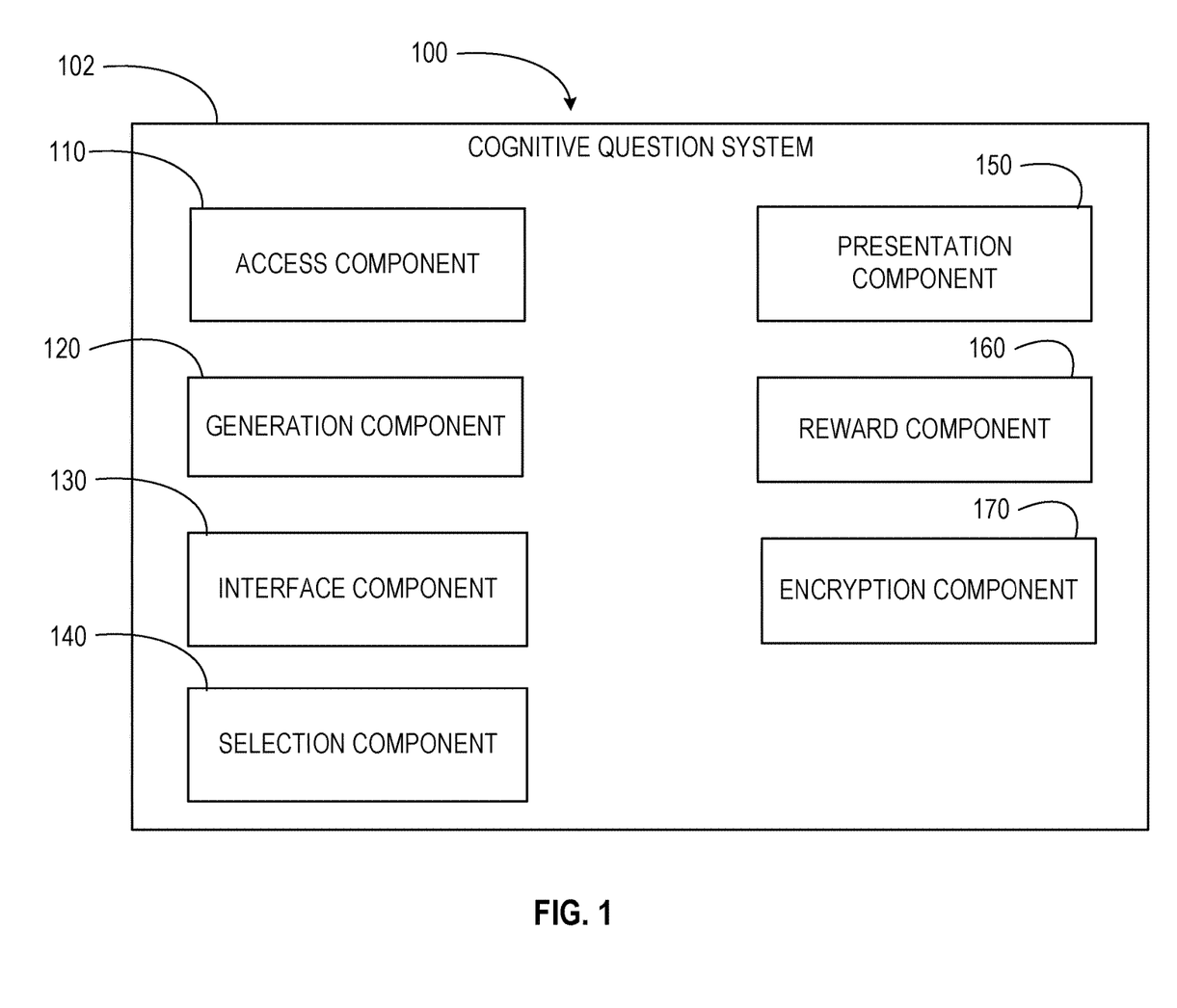
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise a cognitive question system 102. The cognitive question system 102 may comprise an access component 110, a generation component 120, an interface component 130, a selection component 140, a presentation component 150, a reward component 160, and an encryption component 170. The access component 110 may access activity data within a mobile computing device. The generation component 120 may generate cognitive questions and answer sets from the activity data. The interface component 130 may generate question interfaces including selected cognitive questions and corresponding answer sets. The selection component 140 may select cognitive questions from a set of cognitive questions for display within the question interfaces. The presentation component 150 may present or display the question interfaces, including selected cognitive questions and corresponding answer sets, within a display device of the mobile computing device. The encryption component 170 may encrypt cognitive questions and corresponding answer sets.

Figure 2:
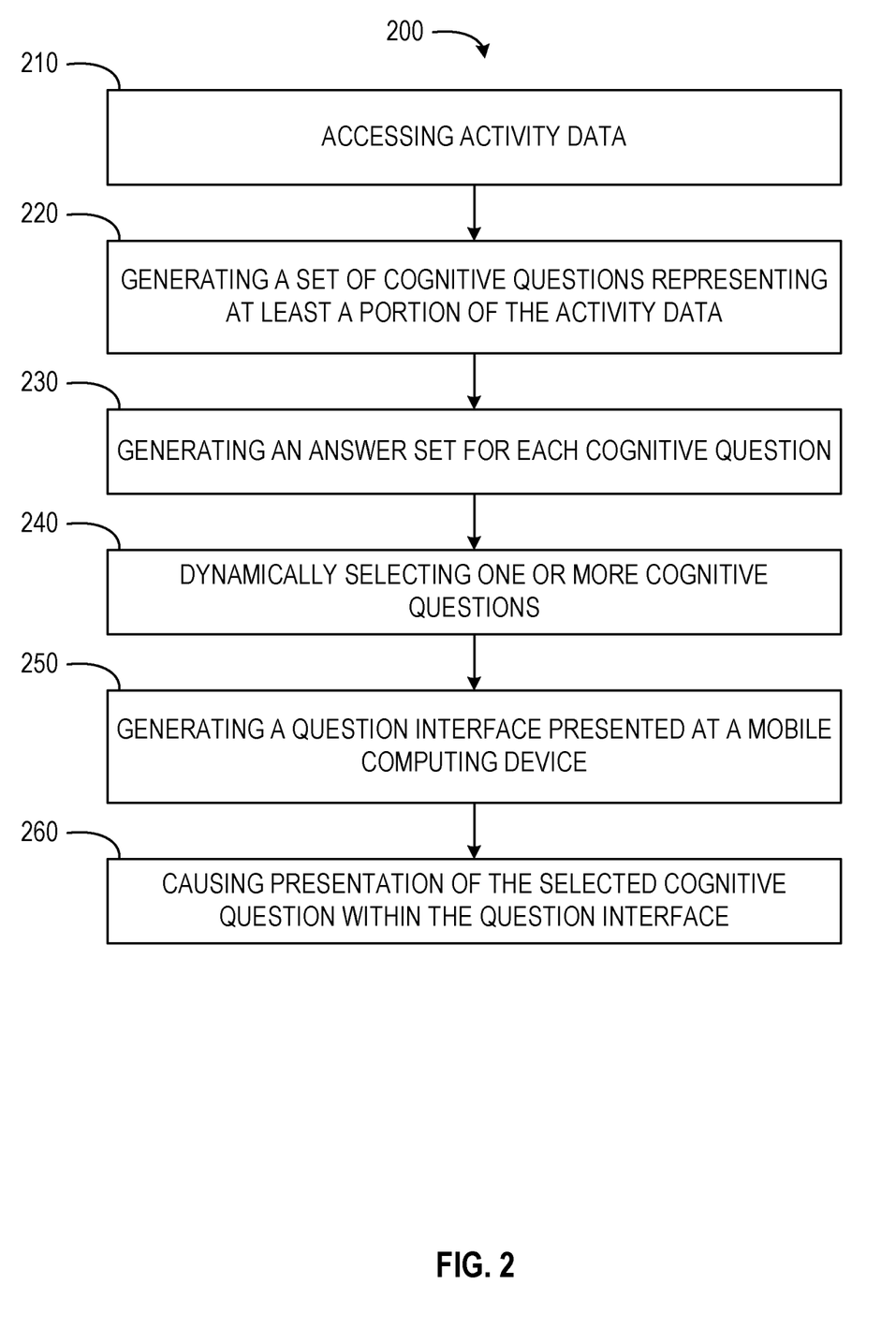
FIG. 2 depicts a block diagram of a computer-implemented method for cognitive question generation and presentation, according to at least one embodiment.

Referring now to FIG. 2, a flow diagram of a computer-implemented method 200 is shown. The computer-implemented method 200 is a method for cognitive question generation and presentation. In some embodiments, the computer-implemented method 200 may be performed by one or more components of the computing environment 100, as described in more detail below.

At operation 210, the access component 110 accesses activity data associated with a mobile computing device. In some embodiments, activity data includes information associated with a user of the mobile computing device or the mobile computing device itself. The information may include at least one of social media data, purchase history, calendar data, and communication data. The communication data may include metadata indicating parties with whom the user communicated recently. The information may also include at least one of location data, movement or travel data, application usage data, and other information relating to positioning or usage of the mobile computing device. Although the information may include references to usage or location of the mobile computing device, the information may be sanitized to remove personal, private, or otherwise sensitive information. In some embodiments, as described in more detail below, the information may be encrypted within the mobile computing device to prevent unauthorized access.

In some embodiments, accessing the activity data includes the access component 110 determining one or more user profile permissions associated with a user of the mobile computing device. Once the user profile permissions have been determined, the access component 110 accesses a subset of activity data available to the mobile computing device. In some embodiments, the subset of activity data corresponds to the one or more user profile permissions.

At operation 220, the generation component 120 generates a set of cognitive questions representing at least a portion of the activity data. In some embodiments, the generation component 120 generates the set of cognitive questions from template questions. For example, the generation component 120 may identify a type of activity data accessed, select a template question or template type, and generate the set of cognitive questions by inserting information from the activity data into the template question or template type. The generation component 120 may also generate the set of cognitive questions from application of natural language processing techniques on the portion of the activity data. For example, the generation component 120 may use natural language processing techniques to parse words associated with the activity data. Once the generation component 120 parses words for the accessed activity data, the generation component 120 may use one or more natural language techniques to automatically generate a cognitive question including at least a portion of the parsed words based grammatical and syntax rules of a language used by the user or the mobile computing device. Although discussed with reference to specific techniques for generating the set of cognitive questions, it should be understood that the generation component 120 may use any suitable technique for generating cognitive questions based on the accessed activity data.

The template questions may be partial sentences configured to receive portions of the activity data or information relating to the activity data inserted to generate a completed, natural language sentence or question. Template questions may include varied types or categories of templates configured to receive or be adapted to differing types of activity data. For example, a first template question or type of template question may be configured for generating a cognitive question for an action performed by a user, such as a question relating to a most recent exercise activity, a most recent purchase activity, or a most recent application usage. Another template question or type of template question may be configured for generating a cognitive question for a location associated with a user or a mobile computing device of the user, such as a recent visit to a relative, an exercise location, or a travel route. Other template questions or types of template questions may be configured for generating a cognitive question relating to usage of a mobile computing device, such as application usage, social media usage, type of application usage, or calendar appointments.

At operation 230, the generation component 120 generates an answer set for each cognitive question of the set of cognitive questions. The answer set may contain a correct answer and one or more incorrect answer. In some embodiments, the answer set contains a plurality of incorrect answers. The generation component 120 may generate the answer set for each cognitive question using one or more of an answer template or natural language processing tools. Although described with reference to specified techniques, it should be understood that the generation component 120 may generate the answer set for each cognitive question in any suitable manner. Once the generation component 120 generates the answer set, the generation component 120 may associate the answer set with the cognitive question, of the set of cognitive questions, for which the answer set was generated. In some instances, the association is generated through metadata, a reference, a link, or any other suitable association capable of enabling embodiments of the cognitive question system to recall the answer set when the associated cognitive question is retrieved.

In instances of answer templates, the generation component 120 may select an answer template associated with the set of activity data or template used to generate the cognitive question. The generation component 120 may populate a plurality of instances of the answer template with one or more words from or associated with the activity data. For example, the generation component 120 may identify a word, phrase, or value representing a correct value for the cognitive question and insert the word, phrase, or value into a portion of the answer template. The generation component 120 may also identify, select, or otherwise generate one or more words, phrases, or values representing incorrect answers and insert the one or more words, phrases, or values into additional instances of the answer template. The generation component 120 may thereby generate a plurality of answers for inclusion in the answer set for the cognitive question generated in operation 220.

In instances where the generation component 120 uses natural language processing tools, the generation component 120 may generate the answer set by identifying a word, phrase, or value within the activity data which was parsed while generating the cognitive question. The word, phrase, or value may represent a correct answer to the cognitive question. The generation component 120 may use the natural language processing tools to generate an answer including the word, phrase, or value using one or more syntax and grammatical rules. The generation component 120 may also generate one or more incorrect answers for the answer set. In some instances, the incorrect answers are generated by substituting the word, phrase, or value of the correct answer with another word, phrase, or value. The generation component 120 may also generate incorrect answers having different syntax, grammatical, or stylistic characteristics than the correct answer.

At operation 240, the selection component 140 dynamically selects one or more cognitive questions from the set of cognitive questions. In some embodiments, the one or more cognitive questions are dynamically selected based on the subset of activity data, accessed in some embodiments of operation 210, and the one or more user profile permissions. The cognitive questions may be selected based on a recency of the subset of activity data, a time of day, a frequency of the activity data, user preferences, or any other suitable characteristic or metric relating to the data or the user. In some instances, the subset of activity data may be subject to a delay. In such instances, activity data may not be selected for inclusion in the subset of activity data where the activity described by the activity data took place too recently. For example, where the activity data is a restaurant name associated with a specified meal, selection of the activity data may be delayed for a twenty-four-hour period, a forty-eight-hour period, or any other suitable time frame. In such instances, activity data may be delayed so that the activity is not currently being performed, or details related to the activity have passed from short term to long term memory.

Figure 3:
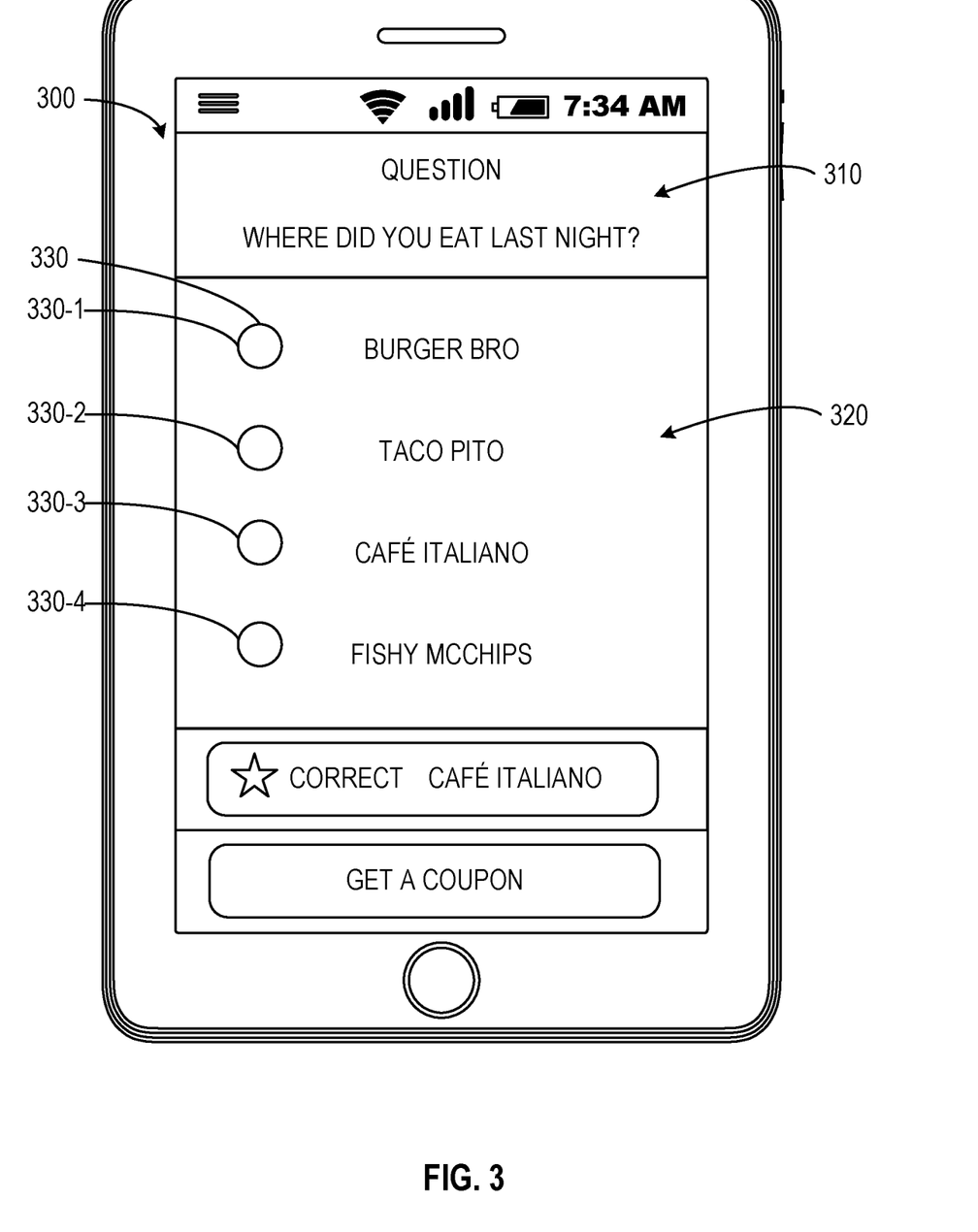
FIG. 3 depicts a question interface for cognitive question generation and presentation, according to at least one embodiment.

At operation 250, the interface component 130 generates a question interface presented by the mobile computing device. In some embodiments, the interface component 130 generates one or more user interface screens presented on a display device of the mobile computing device. As shown in FIG. 3, the one or more interface screens 300 may include a cognitive question 310 and the answer set 320. The one or more interface screens may include one or more answer indicators 330 configured to denote selection of a corresponding answer within the answer set. As shown in FIG. 3, where three answers are included within the answer set 320, the one or more interface screens 300 may include three answer indicators 330-1, 330-2, and 330-3. As such each answer indicator may correspond to a single answer of the answer set. In some embodiments, the question interface may be pre-generated prior to selection of the one or more cognitive questions or may be generated from an interface template. Where the question interface is pre-generated or a template is used, the interface component 130 may generate the question interface by inserting one or more of the cognitive question and the answer set into predefined portions of the interface, such as a text entry field.

At operation 260, the presentation component 150 causes presentation of a selected cognitive question from the one or more cognitive questions. The selected cognitive question is presented within the question interface presented at the mobile computing device. In some embodiments, presentation of the selected cognitive question includes presentation of an answer set corresponding to the selected cognitive question. In some embodiments, the question interface is presented, with the one or more cognitive questions and corresponding answer sets, while a user of the mobile computing device interacts with a specified application containing the cognitive engine. The question interface may also be presented at predetermined times of the day or locations. In some instances, presentation of the question interface may be triggered based on one or more activities of the user or the mobile computing device.

In some embodiments, once the presentation component presents the selected cognitive question and the user selects a correct answer from the answer set, the reward system is triggered. In such embodiments, the interface component 130 detects interaction of the user with the question interface. Interaction of the user may be detected as input received by the mobile computing device. For example, the user may select the answer by tapping a touch screen; selecting an interactive element with a mouse, keyboard, or other suitable input device; scrolling to a desired interactive element corresponding to the correct answer; combinations thereof; or any other suitable user selection method. Upon detecting the interaction of the user, the interface component 130 determines an answer from the answer set which corresponds to the user interaction. The interface component 130 may determine the selected answer is a correct answer from the answer set for the selected cognitive question. The interface component 130 may determine the selected answer is correct by comparing the selected answer to metadata associated with the answer set. The metadata of the answer set may indicate the correct answer. For example, the answer set metadata may include a number or other designation for the correct answer. The interface component 130 may then compare a designation of the selected answer with the designation for the correct answer.

Once the interface component 130 determines the selected answer is the correct answer, the interface component 130 may pass an indication of successful answer to the reward component 160. The reward component 160 may generate a reward based on the selection of the correct answer. In some instances, the reward component 160 generates the reward based on the selected cognitive question or the activity data on which the cognitive question was generated. In some instances, the reward component 160 generates rewards based on user scores for answering questions to incentivize interaction with the cognitive question system and incentivize activities of the user. Rewards may be virtual, such as virtual pets, assistants, or in game bonuses. Rewards may also be tangible, delivered to the user in the real world. The cognitive question system and the reward system may be connected to third party application programming interfaces to provide discounts or other third-party awards to the user. Where the reward component 160 generates the reward based on the selected cognitive question or the activity data, the reward component 160 may select a reward from a reward set. The reward set may include a plurality of possible rewards within the cognitive question system and from third-parties. For example, the selected question may correspond to activity data for running and the reward component 160 may generate the reward by selecting a reward from a third-party running apparel store.

Figure 4:
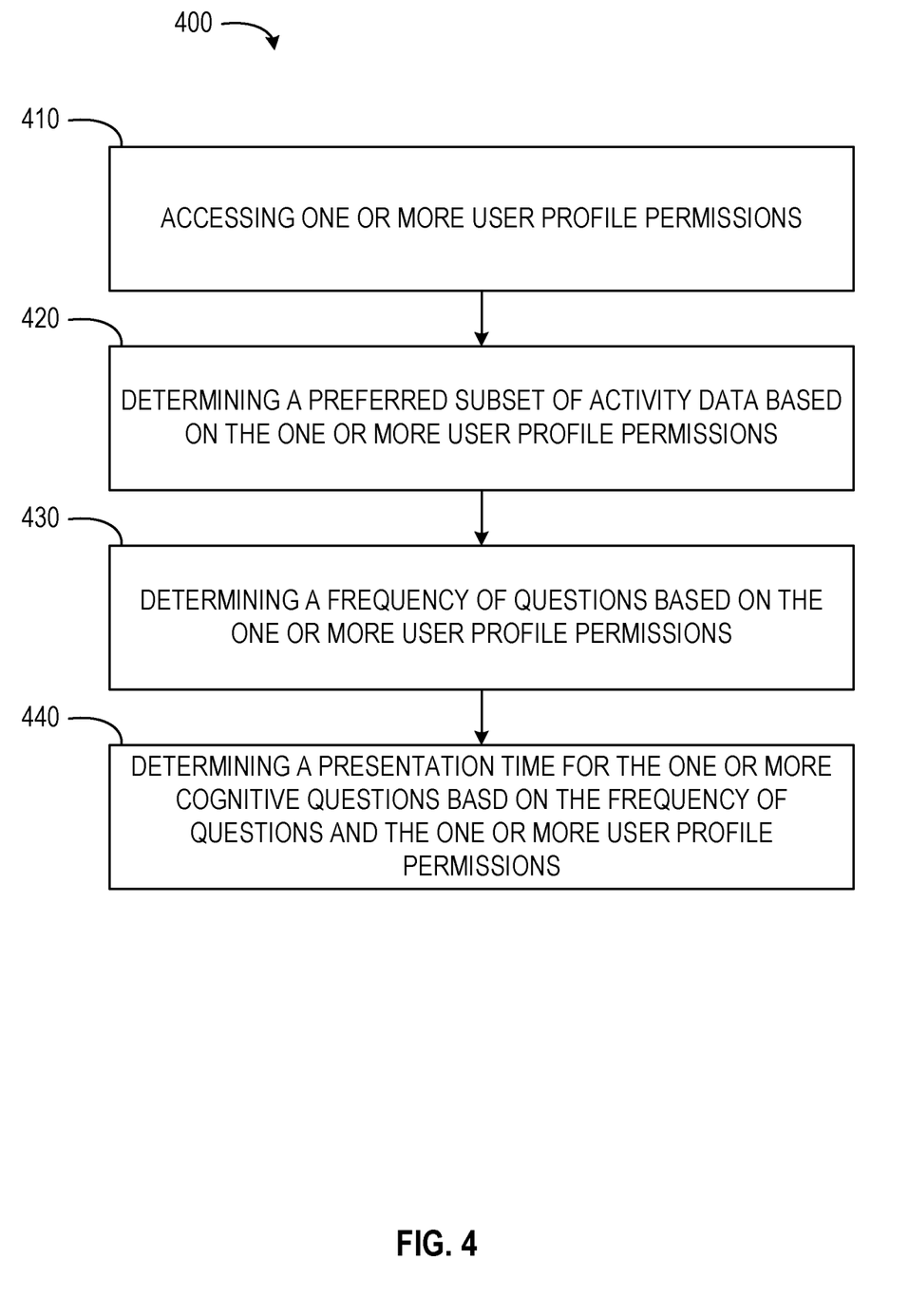
FIG. 4 depicts a block diagram of a computer-implemented method for cognitive question generation and presentation, according to at least one embodiment

FIG. 4 shows a block diagram of an embodiment of a computer-implemented method 400 for cognitive question generation and presentation. The method 400 may be performed by or within the computing environment 100. In some embodiments, the method 400 comprises or incorporates one or more operations of the method 200. In some instances, operations of the method 400 may be incorporated as part of or sub-operations of the method 200.

In operation 410, the access component 110 accesses one or more user profile permissions. In some embodiments, the one or more user profile permissions may be set or selected by the user upon a first use of an application associated with the cognitive engine. In some instances, the one or more user profile permissions are set or selected within a user profile, such that selection of certain preferences applies to later downloaded applications based on application type. The user profile permissions may define inputs, data types, linked accounts, and other approved data from which a user profile may be generated and from which activity data may be derived or obtained. For example, approved inputs and data types may include user inputs or device inputs associated with specified applications or application types, such as social media applications, social media posts, map applications, location and direction inputs, purchase history, purchasing applications, movement data, exercise data, sleep data, health and medical data, and any other suitable information. Linked accounts may include account information selected for inclusion by the user such as purchasing accounts, social media accounts, health accounts, and any other accounts with which approved data or inputs are associated.

Though this disclosure includes the collection of personal data, it is noted that in embodiments, users opt-in to the system and data collection. In doing so, they are informed of what data is collected and how it will be used, that any collected personal data may be encrypted while being used, that the users can opt-out at any time, and that if they opt-out, any personal data of the user is deleted. Further, embodiments of the present disclosure may automatically delete personal data gathered, once the data has been used to generate a cognitive question or once the data has been determined to be unsuitable for use in cognitive question and answer generation. For example, where a user selects only certain personal data for inclusion in the system, other personal data is excluded from capture or deleted once determined that data is not selected for use by the system.

In operation 420, the selection component 140 determines a preferred subset of activity data based on the one or more user profile permissions. In some embodiments, the selection component 140 determines the preferred subset of activity data by accessing the user profile permissions. The selection component 140 may then harvest activity data corresponding to the preferred subset of activity data indicated by the one or more user profile permissions. In some instances, selection of the user profile permissions automatically precludes certain activities, inputs, or data from inclusion in the preferred subset of activity data. In such instances, the preferred subset of activity data may be automatically provided to the selection component 140 or made available to the selection component 140 based on an access request from the selection component 140. For example, where the user profile permissions exclude purchase history and location data, but include social media input history and contact information, the selection component 140 may determine that the preferred subset of activity data includes information relating to social media posts and history and birthdays or other information relating to the user's contacts. In this example, the selection component 140 may prohibit use of or be prohibited from accessing activity data relating to purchases, user locations, combinations thereof, and any other related activity data.

In operation 430, the selection component 140 determines a frequency of questions based on the one or more user profile permissions. In some embodiments, the frequency of questions is established by the user based on a selection within the one or more user profile permissions. For example, the user may select a question frequency of weekly, daily, hourly, combinations thereof, or any other suitable time frame. Similarly, a user may select question frequency to include a number of questions being asked or a range of questions being asked. For example, the user may select a frequency that indicates two to five questions will be asked, no more than ten questions be asked, or only one question asked during any given session. In some embodiments, the selection component 140 determines the frequency of questions based on an account linked to the cognitive question engine. In such instances, the selection component 140 may identify a frequency of questions defined by or suggested in the user profile permissions based on an account, such as a medical records account or medical treatment prescribed within a medical records account. Although frequency of question preferences have been described using specific examples, it should be understood that the user profile permissions and the selection component 140 may define or determine any suitable frequency of questions.

In operation 440, the presentation component 150 determines a presentation time for the one or more cognitive questions based on the frequency of questions and the one or more user profile permissions. In some embodiments, the presentation time for the one or more cognitive questions will be defined by the frequency of questions, such as weekly, daily, or hourly questions. The presentation component 150 may cooperate with one or more of the access component 110 and the selection component 140 to determine the presentation time for the one or more cognitive questions. The presentation time may be defined using a specified time of day, time of week, time interval or time period, or any other suitable time metric. The presentation component 150 may present the one or more cognitive questions at the presentation time. In some embodiments, the presentation component 150 generates and causes presentation of a notification relating to the cognitive questions. For example, where the mobile computing device is locked, the presentation component 150 may generate and present a notification, along with any appropriate sound or haptic indication, requesting the user access the cognitive question system or an associated application to initiate presentation of the one or more cognitive questions.

Figure 5:
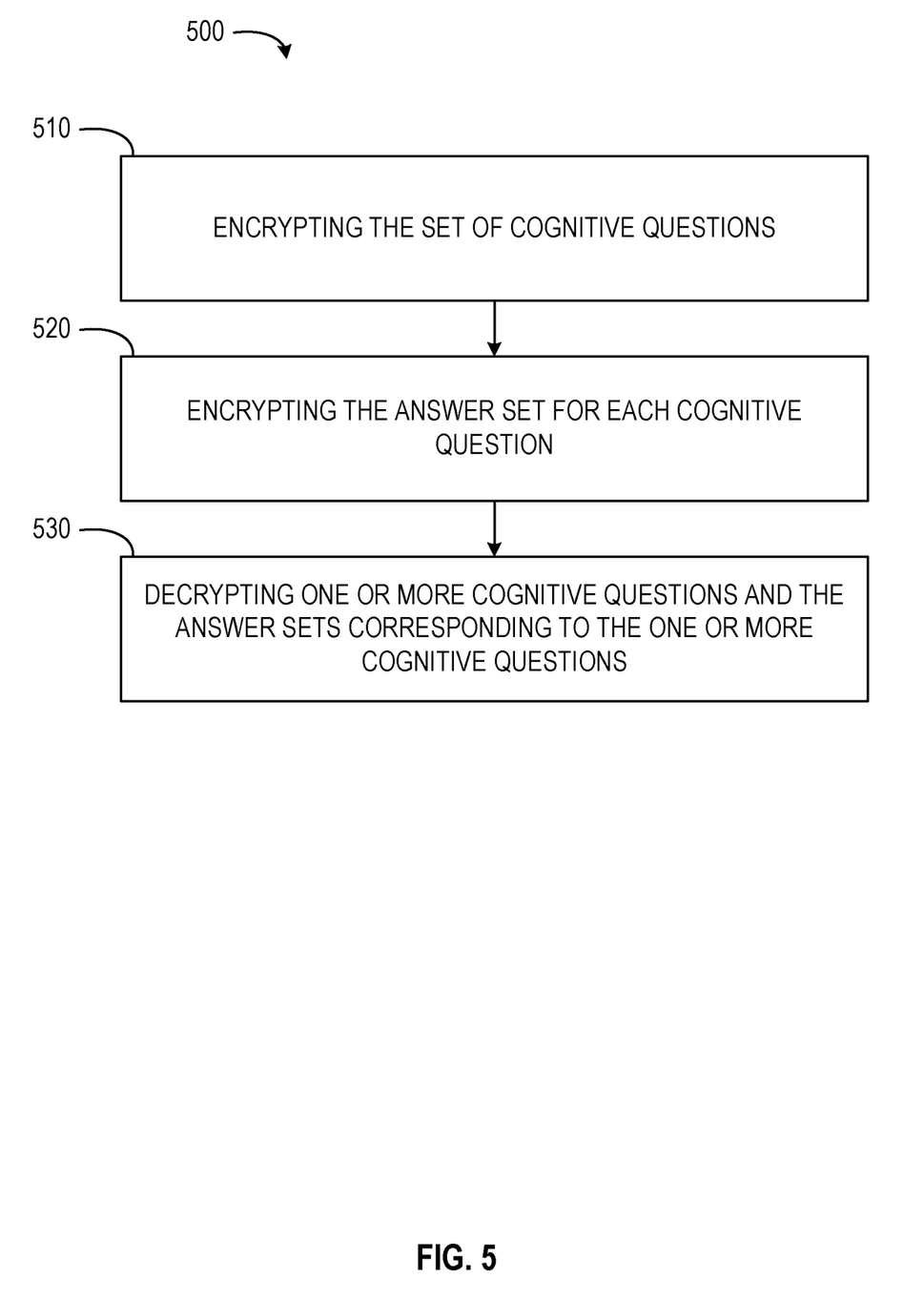
FIG. 5 depicts a block diagram of a computer-implemented method for cognitive question generation and presentation, according to at least one embodiment.

FIG. 5 shows a block diagram of an embodiment of a computer-implemented method 500 for cognitive question generation and presentation. The method 500 may be performed by or within the computing environment 100. In some embodiments, the method 500 comprises or incorporates one or more operations of the methods 200 or 400. In some instances, operations of the method 500 may be incorporated as part of or sub-operations of the methods 200 or 400.

In operation 510, the encryption component 170 encrypts the set of cognitive questions in response to the generation component 120 generating the set of cognitive questions. In some embodiments, the encryption component 170 is triggered when a set of cognitive questions is generated. Upon generation of the set of cognitive questions, the encryption component 170 encrypts the set of cognitive questions. In such embodiments, the set of cognitive questions may be generated at a first time (e.g., after detecting an activity corresponding to a preferred subset of activity data) and designated for presentation at a second time, with a suitable or specified delay between the first time and the second time. The encryption component 170 may encrypt the set of cognitive questions until the second time, at which the set of cognitive questions is designated or otherwise selected for presentation.

In operation 520, the encryption component 170 encrypts the answer set for each cognitive question in response to the generation component 120 generating each answer set. In some embodiments, the answer set for each cognitive question is encrypted in a manner and time similar to or the same as described above with respect to operation 510. The encryption component 170 may encrypt a cognitive question, and the answer set corresponding to that cognitive question, together. In some instances, the cognitive question and the corresponding answer set are encrypted separately. Where the encryption component 170 encrypts the cognitive question and answer set separately, the encryption component 170 may generate a marker, metadata, tag, or other suitable information linking or referencing the encrypted cognitive question and the encrypted answer set. The marker or other linking information may associate or link the cognitive question and the answer set without the cognitive question or answer set being first decrypted.

In operation 530, the encryption component 170 decrypts one or more cognitive questions and the answer sets corresponding to the one or more cognitive questions. Decryption of the one or more cognitive questions and the associated answer sets may be performed in response to selection of the one or more cognitive questions by the selection component 140. In some embodiments, decryption of the cognitive question and the corresponding answer set is performed automatically based on a current time matching the second time at which the cognitive question is designated for presentation. Where the encryption component 170 automatically decrypts the cognitive question and corresponding answer set, the encryption component 170 may reference a time table (e.g., first in/first out or encrypted file names and specified times) indicating which cognitive question and answer set are to be decrypted.

Figure 6:
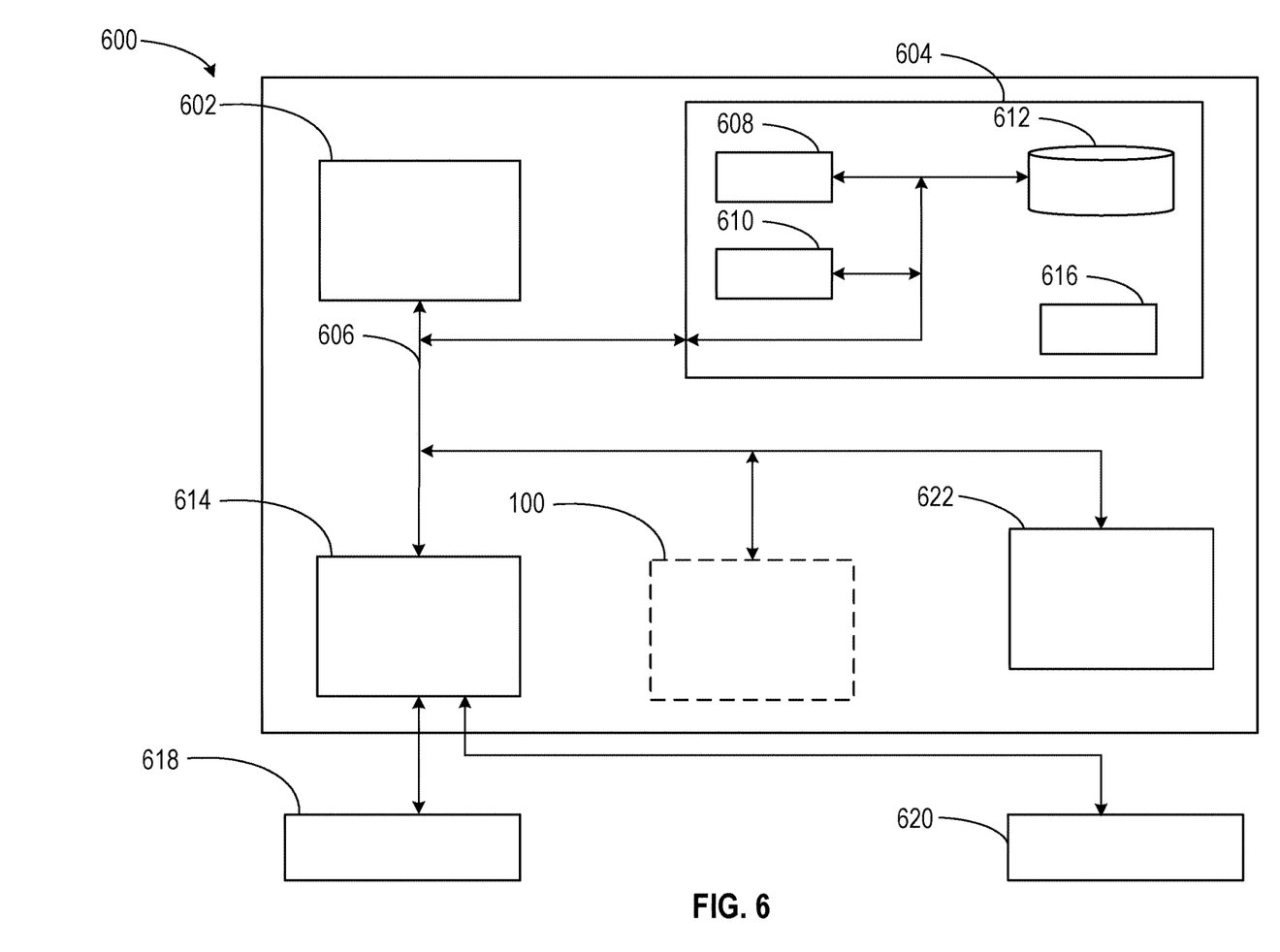
FIG. 6 depicts a block diagram of a computing system for segmenting and distributing media, according to at least one embodiment.

Embodiments of the present disclosure may be implemented together with virtually any type of computer, regardless of the platform being suitable for storing and/or executing program code. FIG. 6 shows, as an example, a computing system 600 suitable for executing program code related to the methods disclosed herein.

The computing system 600 is only one example of a suitable computer system and is not intended to suggest any limitation as to the scope of use or functionality of embodiments of the present disclosure described herein, regardless, whether the computer system 600 is capable of being implemented and/or performing any of the functionality set forth hereinabove. In the computer system 600, there are components, which are operational with numerous other general-purpose or special purpose computing system environments or configurations. Examples of well-known computing systems, environments, and/or configurations that may be suitable for use with computer system/server 600 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in FIG. 6, computer system/server 600 is shown in the form of a general-purpose computing device. The components of computer system/server 600 may include, but are not limited to, one or more processors 602 (e.g., processing units), a system memory 604 (e.g., a computer-readable storage medium coupled to the one or more processors), and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random-access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, the system memory 604 may include at least one program product having a set (e.g., at least one) of program modules that are configured to carry out the functions of embodiments of the present disclosure.

The program/utility, having a set (at least one) of program modules 616, may be stored in the system memory 604 by way of example, and not limiting, as well as an operating system, one or more application programs, other program modules, and program data. Program modules may include one or more of the access component 110, the generation component 120, the interface component 130, the selection component 140, the presentation component 150, the reward component 160, and the encryption component 170. Each of the operating systems, one or more application programs, other program modules, and program data or some combination thereof, may include an implementation of a networking environment. Program modules 616 generally carry out the functions and/or methodologies of embodiments of the present disclosure, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that, although not shown, other hardware and/or software components could be used in conjunction with computer system/server 600. Examples include, but are not limited to: microcode, device drivers, redundant processing units, external disk drive arrays, RAID systems, tape drives, and data archival storage systems, etc.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

What is claimed is:

1. A method, comprising:
accessing activity data, by a computer device, from a mobile computing device, the activity data being associated with a day to day activity indicated by calendar data of an action performed by a user of the mobile computing device, wherein the calendar data includes a calendar appointment of the user of the mobile computing device;
generating, by the computer device, a set of cognitive questions representing at least a portion of the activity data using natural language processing techniques on the portion of the activity data to generate the set of cognitive questions by parsing words in the activity data;
generating, by the computer device, an answer set using the natural language processing techniques for each cognitive question of the set of cognitive questions, the answer set containing a correct answer and a plurality of incorrect answers with a different syntax than the correct answer;
encrypting the set of cognitive questions on the mobile computing device to prevent unauthorized access in response to generating the set of cognitive questions;
encrypting the answer set on the mobile computing device to prevent unauthorized access for each cognitive question in response to generating each answer set, wherein the answer set is separately encrypted from the set of cognitive questions;
dynamically selecting, by the computer device, one or more cognitive questions from the set of cognitive questions based on one of a time of day or a frequency of the activity data;
decrypting, based on a time table comprising specified times and a first-in first-out data processing, the one or more selected cognitive questions and the corresponding answer set;

generating, by the computer device, a question interface presented at the mobile computing device, the question interface including the one or more selected cognitive questions;

causing, by the computer device, presentation of a selected cognitive question from the one or more cognitive questions within a question interface presented at the mobile computing device, presentation of the selected cognitive question including presentation of an answer set corresponding to the selected cognitive question; and generating, by the computer device, a reward triggered by detecting a selection of a correct answer to the selected cognitive question to incentivize interaction with the question interface, wherein the reward includes virtual rewards comprising a virtual pet and an in game bonus.

2. The method of claim 1, wherein the activity data includes information associated with a user of the mobile computing device, the information including a location history of the mobile computing device and the calendar data, and the location history indicates a location or a travel route of the day to day activity, and the day to day activity includes purchase activity.

3. The method of claim 2, wherein accessing the activity data further comprises:

determining, by the computer device, one or more user profile permissions associated with a user of the mobile computing device; and accessing, by the computer device, a subset of activity data available to the mobile computing device, the subset of activity data corresponding to the one or more user profile permissions.

4. The method of claim 3, wherein the one or more cognitive questions are dynamically selected based on the subset of activity data and the one or more user profile permissions.

5. The method of claim 4, wherein dynamically selecting the one or more cognitive questions further comprises:

accessing, by the computer device, the one or more user profile permissions;

determining, by the computer device, a preferred subset of activity data based on the one or more user profile permissions;

determining, by the computer device, a frequency of questions based on the one or more user profile permissions; and determining, by the computer device, a presentation time for the one or more cognitive questions based on the frequency of questions, the one or more user profile permissions, and a predetermined delay.

6. The method of claim 2, further comprising:

generating a linking information associating each of the encrypted cognitive questions and the encrypted answer set.

7. The method of claim 2, further comprising:

determining, by the computer device, selection of a correct answer to the selected cognitive question by comparing the selection to metadata associated with the answer set, wherein the virtual rewards further comprise assistants.

8. A system, comprising:

one or more processors; and a computer-readable storage medium, coupled to the one or more processors, storing program instructions that, when executed by the one or more processors, cause the one or more processors to perform operations comprising:

accessing activity data from a mobile computing device, the activity data being associated with a day to day activity by a user of the mobile computing device, wherein the day to day activity indicated by calendar data includes an action performed by the user, and the calendar data being a calendar appointment of the mobile computing device;

generating a set of cognitive questions using natural language processing tools representing at least a portion of the activity data based on at least a data type of the activity data accessed;

generating an answer set for each cognitive question of the set of cognitive questions, the answer set containing a correct answer and a plurality of incorrect answers using the natural language processing tools to generate the answer set by parsing words in the activity data using a syntax or grammatical rule, the plurality of incorrect answers are generated based on a different syntax than the correct answer;

encrypting the set of cognitive questions on the mobile computing device to prevent unauthorized access in response to generating the set of cognitive questions;

encrypting the answer set on the mobile computing device to prevent unauthorized access for each cognitive question in response to generating each answer set, wherein the answer set is separately encrypted from the set of cognitive questions;

dynamically selecting one or more cognitive questions from the set of cognitive questions;

decrypting, based on a time table comprising specified times and a first in first out data processing, the one or more selected cognitive questions and the corresponding answer set;

generating a question interface presented at the mobile computing device, the question interface including the one or more selected cognitive questions;

causing presentation of a selected cognitive question from the one or more cognitive questions within a question interface presented at the mobile computing device, presentation of the selected cognitive question including presentation of an answer set corresponding to the selected cognitive question; and generating a reward triggered by detecting a selection of a correct answer to the selected cognitive question to incentivize interaction with the question interface, wherein the reward includes virtual rewards comprising a virtual pet and an in game bonus.

9. The system of claim 8, wherein the activity data includes the calendar data indicating the action of the day to day activity performed by the user, and information associated with a user of the mobile computing device, the information including a location history of the mobile computing device and the calendar data, and the location history indicates a location or a travel route of the day to day activity, and the day to day activity includes purchase activity.

10. The system of claim 9, wherein accessing the activity data further comprises:

determining one or more user profile permissions associated with a user of the mobile computing device; and accessing a subset of activity data available to the mobile computing device, the subset of activity data corresponding to the one or more user profile permissions.

11. The system of claim 10, wherein the one or more cognitive questions are dynamically selected based on the subset of activity data and the one or more user profile permissions.

12. The system of claim 11, wherein dynamically selecting the one or more cognitive questions further comprises:
accessing the one or more user profile permissions;
determining a preferred subset of activity data based on the one or more user profile permissions;
determining a frequency of questions based on the one or more user profile permissions; and
determining a presentation time for the one or more cognitive questions based on the frequency of questions, the one or more user profile permissions, and a predetermined delay.

13. The system of claim 9, wherein the operations further comprise:
generating a linking information associating each cognitive question and the encrypted answer set; and
when the selected cognitive question is retrieved, recalling the answer set based on the linking information.

14. The system of claim 9, wherein the operations further comprise:
determining selection of a correct answer to the selected cognitive question by comparing the selection to metadata associated with the answer set,
wherein the reward further includes discounts and other third-party awards to the user.

15. A computer program product comprising a computer readable storage medium having program instructions embodied therewith, the program instructions being executable by one or more processors to cause the one or more processors to perform operations comprising:
accessing activity data from a mobile computing device, and the activity data being associated with a day to day activity by a user of the mobile computing device, wherein the day to day activity indicated by calendar data includes an action performed by the user and location of the action, wherein the calendar data is a calendar appointment of the user of the mobile computing device;
identifying a data type of the activity data accessed;
generating a set of cognitive questions representing at least a portion of the activity data based on at least the data type of the activity data accessed using natural language processing techniques to generate the set of cognitive questions by parsing words in the activity data using a syntax or grammatical rule;
generating an answer set using the natural language processing techniques for each cognitive question of the set of cognitive questions, the answer set containing a correct answer and a plurality of incorrect answers, the plurality of incorrect answers are generated by substituting one of the parsed words of the correct answer with another word;
encrypting the set of cognitive questions on the mobile computing device to prevent unauthorized access in response to generating the set of cognitive questions;
encrypting the answer set on the mobile computing device to prevent unauthorized access for each cognitive question in response to generating each answer set, wherein the answer set is separately encrypted from the set of cognitive questions;
generating a linking information associating each of the encrypted cognitive questions and the encrypted answer set;
dynamically selecting one or more cognitive questions from the set of cognitive questions;
decrypting, based on a time table comprising specified times and a first-in first-out data processing, the one or more selected cognitive questions and the corresponding answer set;
generating a question interface presented at the mobile computing device, the question interface including the one or more selected cognitive questions;
causing presentation of a selected cognitive question from the one or more cognitive questions within a question interface presented at the mobile computing device, presentation of the selected cognitive question including presentation of an answer set corresponding to the selected cognitive question; and
generating a reward triggered by detecting a selection of a correct answer to the selected cognitive question to incentivize interaction with the question interface,
wherein the reward includes virtual rewards comprising a virtual pet and an in game bonus.

16. The computer program product of claim 15, wherein the activity data includes information associated with a user of the mobile computing device, the information including location history of the mobile computing device and the calendar data, and the location indicates a location or a travel route of the day to day activity, and the day to day activity may include purchase activity.

17. The computer program product of claim 16, wherein accessing the activity data further comprises:
determining one or more user profile permissions associated with a user of the mobile computing device; and
accessing a subset of activity data available to the mobile computing device, the subset of activity data corresponding to the one or more user profile permissions.

18. The computer program product of claim 17, wherein the one or more cognitive questions are dynamically selected based on the subset of activity data and the one or more user profile permissions.

19. The computer program product of claim 18 wherein dynamically selecting the one or more cognitive questions further comprises:
accessing the one or more user profile permissions;
determining a preferred subset of activity data based on the one or more user profile permissions;
determining a frequency of questions based on the one or more user profile permissions; and
determining a presentation time for the one or more cognitive questions based on the frequency of questions, the one or more user profile permissions, and a predetermined delay.

20. The computer program product of claim 16, wherein the generating of the set of cognitive questions triggers the encrypting of the set of cognitive questions, and the generating of the answer set of each cognitive question triggers the encrypting of the answer set.

* * * * *